June 14, 1932.   J. E. WALKER   1,863,514
REMOVABLE BED OR BODY FOR WHEELED VEHICLES
Filed Feb. 16, 1929
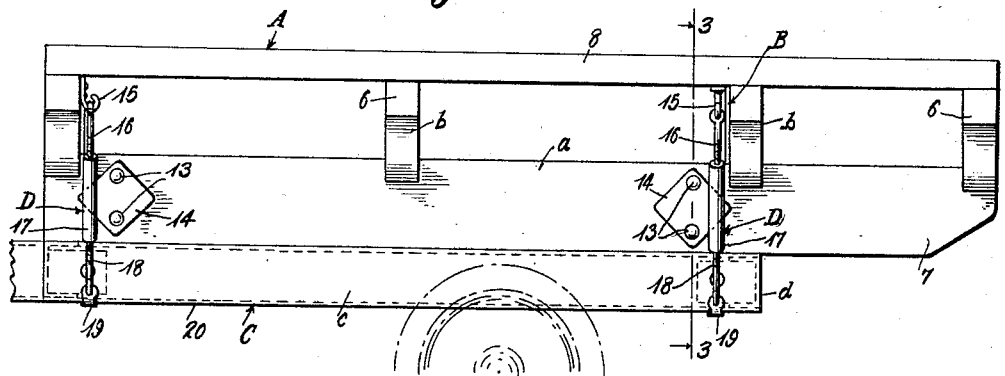
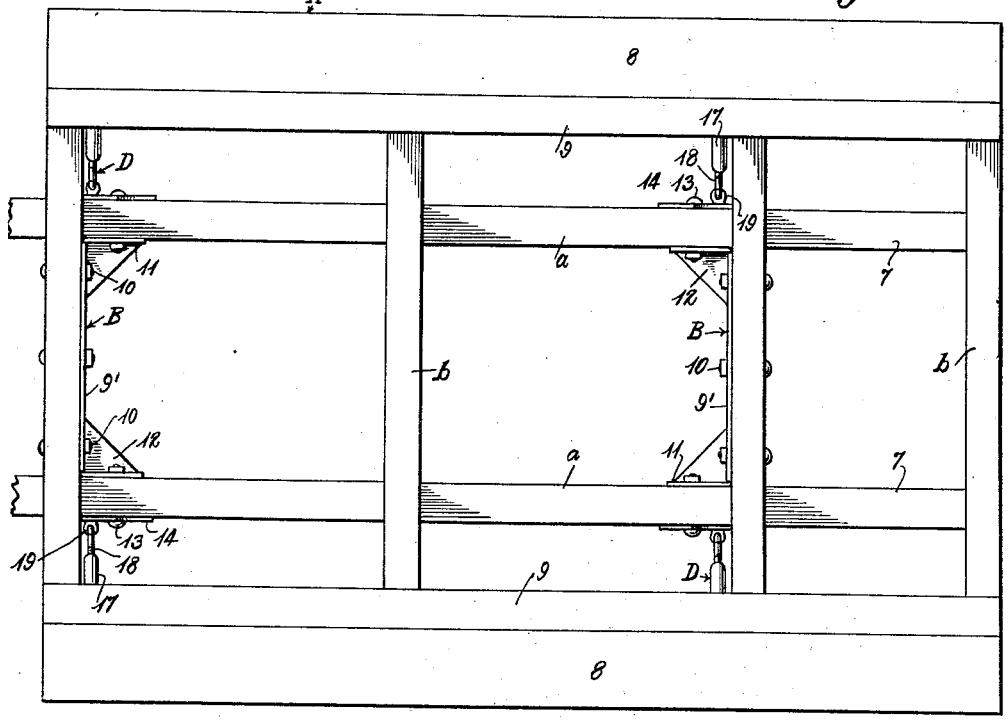
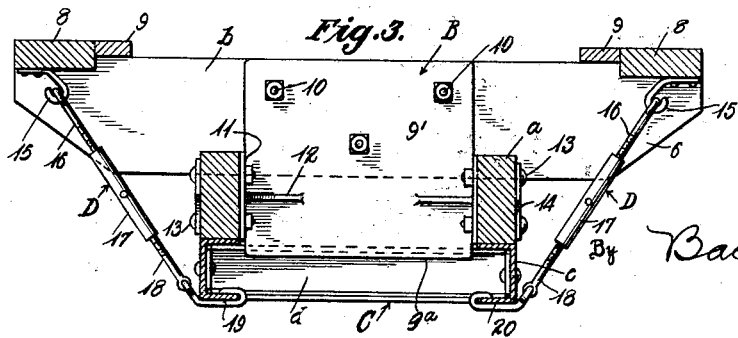
Inventor
John E. Walker
By Bacon & Thomas
Attorneys Patented June 14, 1932

1,863,514

UNITED STATES PATENT OFFICE

JOHN ERWIN WALKER, OF CEDAR CITY, UTAH

REMOVABLE BED OR BODY FOR WHEELED VEHICLES

Application filed February 16, 1929. Serial No. 340,546.

This invention relates to improvements in removable beds or bodies for wheeled vehicles and deals more particularly with a removable bed and novel means for positioning and anchoring such a bed upon the frame of a motor driven vehicle.

The primary object of the invention is to provide a truck bed or body which may be quickly and easily mounted upon the frame portion of a truck or other wheeled vehicle.

A further important object of the invention is to provide novel bracing means for the longitudinal and transverse sills of an automobile truck bed, this said bracing means being provided at spaced points along the length of the removable bed and further functioning to position the bed upon the truck frame and for preventing relative lateral movement of the bed with respect to the frame.

Other objects and advantages of the invention will be apparent during the course of the following description:

In the accompanying drawing forming a part of this specification and in which like numerals are employed to designate like parts throughout the same, Fig. 1 is a side elevational view of a truck bed or body embodying this invention and illustrated as being mounted upon a suitable form of truck frame, Fig. 2 is a top plan view of the structure disclosed in Fig. 1, and Fig. 3 is a transverse sectional view taken upon line 3—3 of Fig. 1.

The device embodying this invention, briefly described, includes a removable truck bed or body designated in its entirety by the reference character A. This bed or body includes longitudinal sills $a$ and transverse sills $b$. Bracing means B are provided for connecting the longitudinal sills $a$ with certain of the transverse sills $b$. The bracing means B further functions to properly position the removable truck bed or body with respect to a truck frame C. This truck frame includes side bars $c$ and end bars $d$ which are suitably interconnected at their meeting ends.

For the purpose of anchoring the removable truck bed A upon the truck frame C, bracing and holding members D are provided and are connected to the bed and frame A and B respectively at suitable intervals.

It is believed that the above brief description will enable anyone skilled in the art to rapidly determine the manner in which the truck bed or body embodying this invention is associated with a truck frame and further to understand in a general way the manner in which the truck bed is constructed. For the purpose of more completely disclosing the details of the invention, the device will be more completely described as follows:

In the drawing, wherein for the purpose of illustration is shown a preferred embodiment of the invention, the removable truck bed or body A consists of longitudinally extending sills $a$ which may take the form of timbers, as illustrated, or these sills $a$ may be constructed of channel or angle-iron stock. The sills $a$ preferably are spaced laterally with respect to each other a distance substantially equal to the spacing of the side bars $c$ of the truck frame C so that the sills $a$ may rest directly upon the upper faces of the said bars. The transversely extending sills $b$ may be constructed from timbers or metal stock and they are located at suitable intervals along the lengths of the longitudinal sills $a$. The transverse sills $b$ include overhanging end portions 6 which project beyond the longitudinal sills $a$ to increase the width of the truck bed beyond that of the truck frame. It will be noted, by inspecting Figs. 1 and 2, that the longitudinal sills $a$ of the truck bed project rearwardly, as at 7 beyond the rear end of the truck frame C and one of the transverse sills $b$ connects the projecting end portions 7 of the longitudinal sills $a$. It is to be understood that any desired form of body may be provided; namely, a closed delivery truck body, an open top delivery body, a hay rack, etc., but merely for the sake of illustration, longitudinal timbers 8 are illustrated as being mounted upon the laterally projecting or overhanging end portions 6 of the transverse sills $b$. This type of body, that is with the top timbers 8, will be best suited for farm use. Additionally, longitudinal finishing strips 9 may be mounted upon the upper edges of the transverse sills $b$ and it is to be understood that any desired number of these strips may be employed.

For the purpose of connecting the transverse sills $b$ to the longitudinal sills $a$, any suitable form of bolt connection may be provided. Such connecting elements have not been disclosed. For further bracing the transverse sills with respect to the longitudinal sills, bracing plates 9' are connected to certain ones of the transverse sills $b$. These plates 9' may be square, rectangular or substantially triangular in contour and portions of the same will be anchored to the transverse sills by bolts, or the like 10, while a depending portion 9a will pass between the longitudinal sills $a$ and will enter the space between the longitudinal bars $c$ of the truck frame C. These portions 9a of the plates 9' will prevent relative lateral movement of the truck bed with respect to the frame and will determine the proper location of the bed with respect to said frame. By locating the transverse sills $b$ to which the plates 9 are connected so that the said plates will occur in the regions of the transverse bars $d$ of the truck frame, the depending edge portion 9a of the plates will engage against these end bars $d$ and will prevent longitudinal movement of the bed with respect to the frame. Figs. 2 and 3 disclose bracing plates 11 which may be connected to the plates 9' by webs 12 which preferably are formed integrally with the plates 9' and may be welded to the plates 11. It further is to be understood that the plates 11 may constitute angular extensions of the plates 9'. Securing bolts or rivets 13 pass through the plates 11 and the longitudinal sills $a$ for connecting these two members together. A finishing plate 14 may be positioned on the outer side of each longitudinal sill $a$ opposite each plate 11 and these plates 14 will prevent the securing elements 13 from pulling through the said sills.

After a truck bed is positioned upon the truck frame C, with the edge portions 9a of the bracing plates 9' properly located between the side bars $c$ of the truck frame, additional anchoring and bracing means D are employed for retaining the bed upon the frame. This bracing means D may be positioned at any suitable points along the length of the bed and include hook-shaped members 15 secured to the bed, preferably to the under sides of the longitudinal timbers 8. Threaded rods 16 are mounted upon the hooked members 15 and are associated with the sleeve elements 17. Additional threaded rods 18 are associated with the opposite ends of the sleeves 17 and these rods 18 have pivotally connected to their outer ends angularly formed hooks 19 having end portions which are illustrated as being in engagement with the bottom flanges 20 of the side bars $c$ of the truck frame. It will be understood that the rods 16 and 18 and the sleeve 17 form double acting turnbuckle structures. It further will be noted that these bracing members D extend at approximately 45 degree angles with respect to the vertical plane passing through the bars and sills $c$ and $a$, respectively. This angular arrangement of the bracing members D will function to prevent buckling of the truck bed in any direction with respect to the side bars $c$ of the truck.

It is believed that the truck bed illustrated and described herein may be readily assembled upon a truck frame and that it will be secured and braced in such a manner that very heavy loads may be carried upon any portion of the bed without breaking down the latter.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. The combination with the frame of a wheeled vehicle, of a bed including longitudinal sills and transverse sills, and angular bracing plates connected to the side sills and certain of the transverse sills, said bracing plates depending below the longitudinal sills for engagement with the truck frame to position the bed upon the frame.

2. The combination with a frame of a wheeled vehicle including side and end bars interconnected to form a rectangular structure, of a bed resting upon said frame, and plates secured to the bed and depending therefrom to project into the space formed between the side and end bars of the frame for preventing relative lateral and longitudinal movement between the frame and bed.

3. The combination with a frame of a wheeled vehicle including side and end bars interconnected to form a rectangular structure, of a bed resting upon said frame and including longitudinal and transverse sills which register with the side and end bars of the frame, and bracing plates employed for connecting the longitudinal and transverse sills of the bed, said bracing plates depending below the bed to project into the space formed between the side and end bars of the frame for preventing relative lateral movement of the bed with respect to the frame.

In testimony whereof I affix my signature.

JOHN ERWIN WALKER.